Aug. 21, 1923. 1,465,649
G. S. MacLEOD ET AL
AUTOMOBILE BUMPER
Filed March 22, 1923
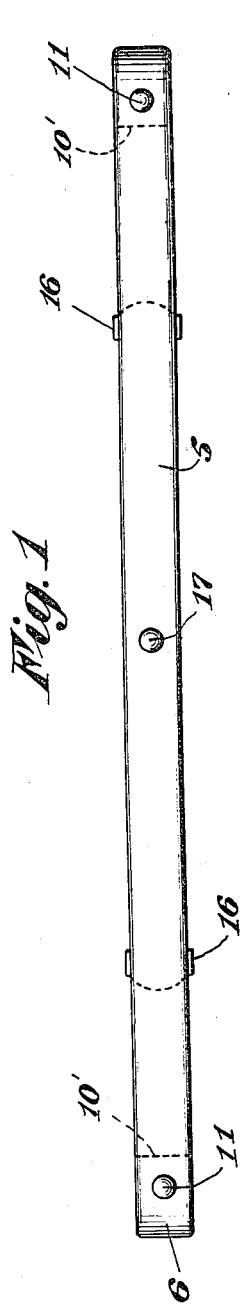
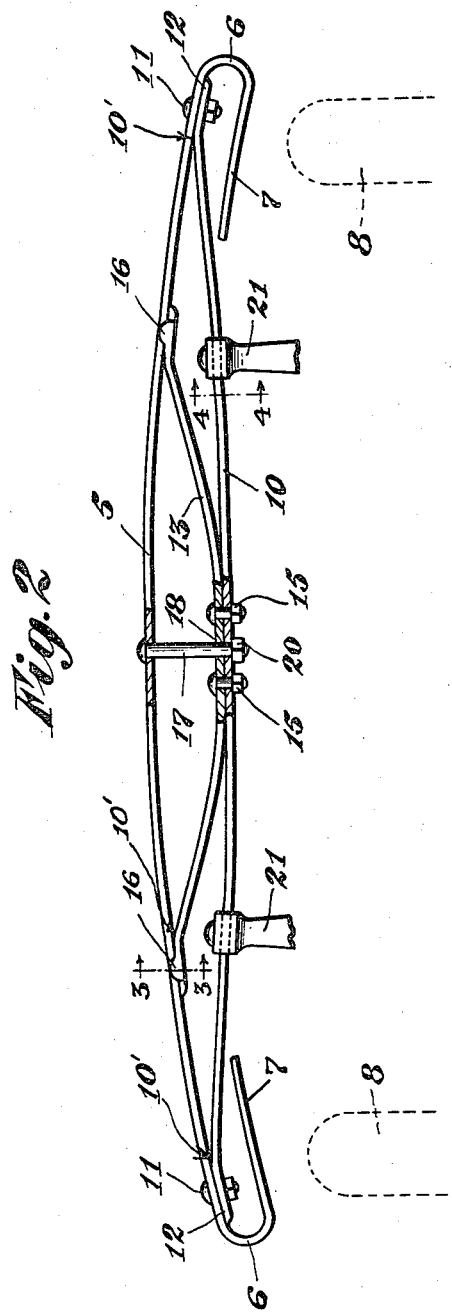
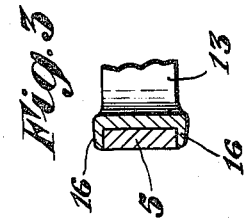
Inventor
George S. MacLeod
Angus P. MacLeod.
By Pierre Barnes
Attorney Patented Aug. 21, 1923.

1,465,649

UNITED STATES PATENT OFFICE.

GEORGE S. MacLEOD AND ANGUS P. MacLEOD, OF SEATTLE, WASHINGTON.

AUTOMOBILE BUMPER.

Application filed March 22, 1923. Serial No. 626,787.

*To all whom it may concern:*

Be it known that we, GEORGE S. MACLEOD and ANGUS P. MACLEOD, citizens of the United States, residing at Seattle, in the county of King and State of Washington, have invented certain new and useful Improvements in Automobile Bumpers, of which the following is a specification.

This invention relates to automobile bumpers, and its object, generally, is the improvement of devices of this character to render the same more durable and efficient than others hitherto in use.

More specific objects and advantages of the invention will appear in the following description.

The invention consists in the novel construction, arrangement and combination of parts hereinafter described and claimed.

In the accompanying drawing,—

Figure 1 is a front elevation of a bumper embodying the present invention. Fig. 2 is a top plan view thereof, partly in section. Figs. 3 and 4 are detail sectional views on lines 3—3 and 4—4, respectively, of Fig. 2.

In said drawing, the reference numeral 5 designates a transversely arranged arcuate shaped fender bar of a length to extend beyond the outer planes of the wheels, indicated by 8, of the vehicle to which the invention is applied.

Said fender bar adjacent its ends is looped by the provision of bends 6 with inwardly directed terminal elements 7 disposed at the rear of the main portion of the bar and preferably parallel therewith.

10 represents a transversely arranged bar which is bent at 10¹ to provide extremities 12 which extend into the respective loops of the fender bar and seat against the rear surface of main portion of the latter and to which the supporting bar is secured by rivets or bolts 11, as shown, so as to maintain the supporting bar in substantially the bowed form in which it is illustrated in Fig. 2.

13 represents a transversely arranged spring metal bar, hereinafter designated as the cushion bar, which is interposed between the aforesaid bars.

Said cushion bar is of an arcuate shape, the central rear portion of which is secured by spaced rivets or bolts 15 to said supporting bar. The outer ends of the cushion bar bear against the rear surface of the fender bar and are slidably connected to the latter by the provision upon the cushion bar of forwardly directed ears 16 engaging the upper and lower edges respectively of the fender bar.

17 represents a bolt rigidly secured to the fender bar at its midlength and thence extends loosely through aligned apertures 18 provided in the cushion bar and the supporting bar. A nut 20 threaded upon the bolt 17 to the rear of the supporting bar serves to limit the extension of the bumper longitudinally of the associated vehicle.

The bumper is coupled with a vehicle by means of bracket attachments such as indicated by 21, for example, which are advantageously connected to the supporting bar 10 at approximately midway between the central bolt 17 and the outer ends of the bumper.

Primarily, the fender bar 5 is given a curvature slightly more than that in which it is illustrated, and the supporting bar 10 is straight between the bends 10¹ so that when brought together and coupled by the bolts 11, the bars will assume substantially the shapes in which they are shown in Fig. 2, thereby subjecting the structure to stresses and causing the supporting bar 10 to function somewhat in the manner of the chord member of a structural truss.

The cushion bar 13 engaging the fender bar intermediate its center and the respective ends serves to yieldingly support the fender bar at such locations and cooperates with the supporting bar to distribute throughout the bumper structure collision shocks applied thereto either at the ends or at positions intermediate the length of the bumper.

While we have described the invention with respect to a front bumper for an automobile, it is to be understood that the bumper is also employed as a rear bumper, and the descriptive terms front, rear, etc., hereinbefore used with respect to a front bumper are relative and not restrictive.

What we claim, is—

1. An automobile bumper comprising a bowed fender bar, a bowed supporting bar having its ends rigidly secured to the fender bar, and a supplemental bar interposed between the two first named bars and rigidly connected at its midlength to said supporting bar, the ends of said supplemental bar having its ends connected to the fender bar for relative lateral movements.

2. An automobile bumper comprising a bowed fender bar having looped extremities, a bowed supporting bar having its ends extend into the respective loops of the fender bar, the ends of said supporting bar being rigidly secured to the fender bar, and a supplemental bar interposed between the two first named bars and rigidly connected at its midlength to said supporting bar, the ends of said supplemental bar having its ends connected to the fender bar for relative lateral movements.

3. An automobile bumper, comprising a fender spring bar having an outward curvature and formed at each of its ends with a relatively short return bend, a supporting spring bar curved opposite to said fender bar and rigidly connected at its ends to said fender bar within said return bends, a supplemental spring rigidly connected at its midlength to said supporting bar and having its ends arranged to be laterally movable upon and to bear against the inner face of said fender bar, and a bolt secured to said fender bar and having a sliding engagement with the supporting bar.

Signed at Seattle, Washington, this 16th day of March 1923.

GEORGE S. MacLEOD.
ANGUS P. MacLEOD.